Sept. 16, 1941.  H. LAUB  2,256,395
GAS ANALYSIS APPARATUS
Filed Feb. 25, 1939
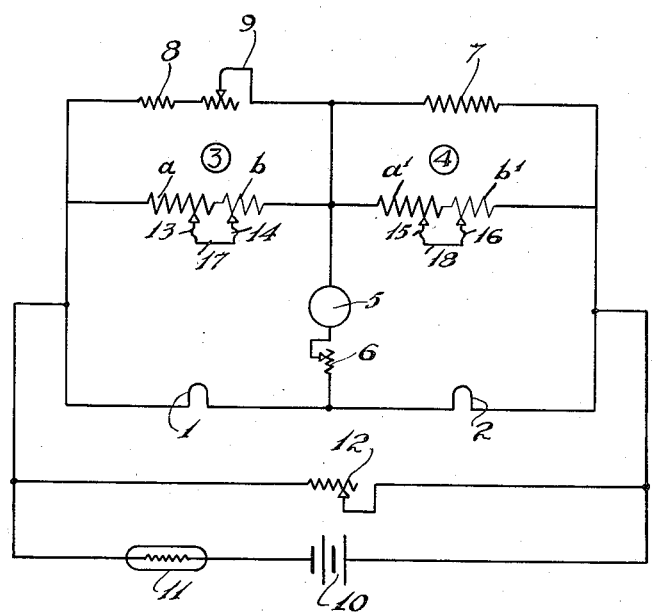
INVENTOR
Hans Laub,
BY
Frdk. C. Fischer
ATTORNEY Patented Sept. 16, 1941

2,256,395

UNITED STATES PATENT OFFICE 2,256,395

GAS ANALYSIS APPARATUS

Hans Laub, Millburn, N. J., assignor to Charles Engelhard, Inc., Newark, N. J., a corporation of New Jersey Application February 25, 1939, Serial No. 258,504

5 Claims. (Cl. 73—51)

This invention relates to improvements in apparatus for analyzing gases and vapors, by means of thermal conductivity methods. The usual apparatus for this purpose is based on measuring the thermal conductivity of the gas to be tested by means of a Wheatstone bridge and comparing the same with the thermal conductivity of a known standard or reference medium, usually also a gas.

In particular, my invention relates to an apparatus for analyzing gases in which the gas or vapor to be analyzed is passed through a cell in which a heater element is mounted which forms one arm of the Wheatstone bridge, and in which the standard gas or other medium having heat conductive properties is contained in another cell also provided with a heater element which forms another arm of the Wheatstone bridge, the circuit of the Wheatstone bridge being completed by two other resistance wires of fixed resistance usually termed ratio elements. In such apparatus the ratio of the resistances of the ratio elements is usually adjusted in such manner that the Wheatstone bridge is balanced when the gas or vapor to be analyzed has a thermal conductivity equal to that of the standard gas or other medium. If the thermal conductivity of the gas in the test cell is different from that of the gas or other medium in the standard cell, for instance as the result of a change in the chemical composition of the gas to be tested, the heat will be conducted from one heating element at a greater rate than from the other heating element, so that the resistance of the heater element in the test cell is changed and the balance of the Wheatstone bridge is destroyed. The degree of unbalance is indicated by a galvanometer and is a measure for the change in thermal conductivity and for the change in the chemical composition of the gas under investigation.

The apparatus heretofore known is subject to certain shortcomings. The chemical composition of a gas or vapor is often measured under temperature conditions which vary within a wide range, such variations being due primarily to differences in the ambient temperatures. For instance, exhaust gas analyzers installed in aeroplanes to determine the ratio of fuel and oxygen containing gas in the intake of the internal combustion engine are subjected to temperatures varying within a wide range, depending on differing flight conditions, differing altitudes, season and ambient temperatures. The different temperatures to which the apparatus is thus exposed cause errors in the measurement which are often intolerable. I have found that in an apparatus of the type described for the analysis of exhaust gases of aeroplane engines the error in the case of lean mixtures may be 25% or more and in the case of rich mixtures about 20%, if the temperature is varied from 5° C. to 45° C. This temperature error is due to two causes. The thermal conductivity of the gases and the like varies with varying temperature; this error can sometimes be eliminated by keeping constant the temperature of the gas or other medium in the heater cells by thermostating or the like. Often, however, it is impractical or otherwise impossible to keep the temperature constant, but even then the magnitude of the error resulting in changes of the thermal conductivity of the gases or the like is small and usually not objectionable.

The major part of the error is due, however, to the fact that the properties of the various elements constituting the Wheatstone bridge do not change uniformly and proportionally with changing temperatures. The resistors in the ratio arms commonly comprise materials, the electrical resistance of which does not change with varying temperatures, such as Manganin, an alloy composed of 84% copper, 12% manganese and 4% nickel, or Constantan, an alloy composed of 60% copper and 40% nickel, or of other similar materials, while the heater elements in the standard and analysis cells commonly comprise materials having a high temperature coefficient of electrical resistance, such as platinum, nickel, tungsten, alloys thereof, such as platinum alloys, or the like. So long as the apparatus is employed at a given constant temperature with such an arrangement, in which the metals of the ratio elements and of the heater elements differ greatly in regard to their temperature coefficients of electrical resistance, satisfactory results are obtained, as all elements will remain in balance, except for the unbalance created by a change in the composition of the gas or vapor in the analysis cell. If the temperature to which the apparatus is exposed changes, an error of appreciable magnitude results, as the changes taking place in the electrical resistance of the various elements will not be substantially identical, so that the relation of the resistances in the heater elements and in the ratio elements differs at different temperatures. This difference will occur where the resistances in the heater elements are made of construction materials having a high temperature coefficient of electrical resistance, such as platinum, while the resistances in the ratio elements are made of construction materials having a resistance not dependent on temperature, such as Manganin, or having a temperature coefficient of electrical resistance different from that of the heater elements.

It is one object of my invention to provide an analyzer of the type described which shall not have the above mentioned shortcomings, but in which the arms of the Wheatstone bridge will remain in substantial balance over a wide range of temperatures.

It is another object of my invention to provide an exhaust analysis apparatus for the analysis of exhaust gases of combustion engines of aeroplanes to assure the presence of the desired mixture of fuel and oxygen containing gas, such as air, in the combustion chambers thereof.

It is generally desirable, and in many cases necessary, to provide an apparatus which will give satisfactory results under conditions of varying temperature, even though the temperature may vary as much as 40 or 50° C.

It is, therefore, another object of my invention to provide an apparatus of the type described which will function satisfactorily under conditions where the temperature will vary within a range of 40 or 50° C.

I have found that my objects can be attained in a simple and extremely practical and inexpensive manner by constructing the heater elements and the ratio elements in such manner that the temperature coefficient of electrical resistance thereof is substantially identical, thus keeping the circuit of the Wheatstone bridge in perfect balance at any temperature over a wide range of temperature fluctuations. If the heater elements are constructed of platinum the complete balance at any temperature over a wide range is obtained if the construction material of the ratio elements also comprises platinum or a material having a temperature coefficient of electrical resistance similar to that of platinum, over the desired range of temperatures, such as copper, or alloys such as Hytemco, an alloy containing 70% nickel and 30% iron. Similarly, if the heater elements comprise tungsten, the ratio elements should also consist of tungsten or a material having a similar coefficient of electrical resistance over the desired range of temperatures.

I have found that the object of my invention can also be accomplished by other means not requiring the use of the same or similar construction materials for all the elements of the Wheatstone bridge. I have found that it is possible to combine two or more different resistance materials, each having different temperature coefficients of electrical resistance, in such manner that the combination thereof has a temperature coefficient of electrical resistance equal to or substantially equal to that of the resistance material used in the other element or elements.

For many purposes, the use of platinum or platinum alloys in all elements of the Wheatstone bridge is either impractical or too expensive. If the heater elements consist of platinum which has a temperature coefficient of approximately 0.39% per degree C., the ratio elements can be constructed of nickel wire, having a temperature coefficient of approximately 0.49% per degree C., combined with Manganin wire, having a zero temperature coefficient, in such manner that the nickel wire constitutes approximately 80% and the Manganin wire constitutes approximately 20% of the total resistance. The two portions of the ratio elements may be wound on a common spool and connected in series or in multiple or a combination thereof as may be desired. Materials other than nickel and Manganin may be advantageously used provided the proper proportion necessary for the production of a temperature coefficient of electrical resistance equal to that of the heater elements is selected.

The operation of the invention is illustrated in the accompanying drawing, forming part hereof, representing a wiring diagram of a gas analysis apparatus of the type herein described. The Wheatstone bridge is shown to comprise heater element 1 in the standard cell, heater element 2 in the analysis cell, and ratio elements 3 and 4. The indicating meter 5 is connected across one diagonal of the bridge in series with a resistor 6 serving to adjust the sensitivity of the apparatus. A fixed resistance 7 is connected in shunt with ratio element 4, whereas ratio element 3 is shunted by a fixed resistance 8 and an adjustable resistance 9, connected in series. The combination of resistors 8 and 9 serves to adjust the balance of the bridge circuit with a gas of equal thermal conductivity contained in the standard and analysis cells. Current is supplied to the Wheatstone bridge from a source 10, e. g. a battery. The current supplied to the bridge may be kept constant by means of a ballast tube 11, which may for instance be in the form of an iron wire in a glass envelope filled with hydrogen. The quantity of current supplied to the bridge may be varied by means of a resistor 12 which forms a shunt to the bridge circuit.

The ratio elements 3 and 4 show one modification of my invention in which two dissimilar materials are connected to form one joint resistance. Each of the ratio elements 3 and 4 are formed of two sections. The ratio element 3 comprises the sections $a$, and $b$; and the ratio element 4 comprises the sections $a'$ and $b'$. The material from which sections $a$ and $a'$ are constructed is substantially the same; and likewise sections $b$ and $b'$ are constructed from substantially the same material. However, the section $a$ has a different temperature coefficient of electrical resistance from section $b$; and the same applies to sections $a'$ and $b'$. The temperature coefficients of electrical resistance of $a$ and $b$ are adjusted so that the combined temperature coefficient of the ratio element, including sections $a$ and $b$, will be equal to that of a heater element 1 or 2. Sections $a'$ and $b'$ are similarly adjusted to obtain a like condition. The construction material for elements $a$ and $a'$ may have for instance a very low temperature coefficient or a zero temperature coefficient, such as possessed by Manganin or Constantan, whereas the construction material for elements $b$ and $b'$ may have a high temperature coefficient of electrical resistance, such as possessed by nickel, the combined temperature coefficient being equal to that possessed by the construction material for heater elements 1 and 2.

The drawing also shows adjustable taps 13, 14, 15 and 16. Taps 13 and 14 are connected by a lead wire 17, and taps 15 and 16 are connected by a lead wire 18, furnishing means of adjustment for the temperature coefficient of ratio elements 3 and 4 respectively, by changing the operative length of elements $a$ and $b$ in ratio elements 3 and of elements $a'$ and $b'$ in ratio element 4. This means of adjustment has been found to be very convenient in calibrating the apparatus in such manner as to reduce the temperature error to a very minimum.

I have found that with my invention the temperature error due to dissimilar changes in the properties of the construction materials for the cooperating arms of the Wheatstone bridge has been reduced substantially. In the case of exhaust gas analyzers installed in aeroplanes the error within a temperature range of 5° C. to 45° C. has been reduced to even less than 2% in the case of a lean mixture, the remainder being due entirely to the change in thermal conductivity of the gases tested.

My invention also applies to other instruments or apparatus in which a Wheatstone bridge is provided which in the use thereof is subjected to varying temperature conditions, as for instance in instruments for the measurement of temperatures, in which a Wheatstone bridge is used in connection with a resistance thermometer.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent is:

1. In a gas analysis apparatus, a Wheatstone bridge having two heater elements and two ratio elements, said heater elements being made from a material having a high temperature coefficient of electrical resistance, each of said ratio elements having two sections one of which sections has a temperature coefficient of electrical resistance greater than that of the heater element and the other of said sections having a temperature coefficient of electrical resistance smaller than that of the heater elements so that the combined temperature coefficient of electrical resistance of both of said sections will be substantially equal to that of a heater element, and means to adjustably connect the two sections of each ratio element to vary the electrical resistance and the temperature coefficient of the electrical resistance of said element.

2. In a gas analysis apparatus, a Wheatstone bridge having two heater elements and two ratio elements, said heater elements being made of platinum, each of said ratio elements comprising at least two resistance sections, one of said resistance sections being made of nickel and the other section being made of an alloy containing substantially 84% copper, 12% manganese, and 4% nickel, said nickel resistance section constituting approximately 80% of the total resistance of the ratio element, said section being proportioned so that the coefficient of electrical resistance of a ratio element is substantially equal to that of a heater element, and means to adjustably connect the two sections of each ratio element to vary the electrical resistance and the temperature coefficient of the electrical resistance of said element.

3. In a gas analysis apparatus, a Wheatstone bridge having two heater elements and two ratio elements, said heater elements being made from a material having a high temperature coefficient of electrical resistance, each of said ratio elements having two sections one of which sections has a temperature coefficient of electrical resistance greater than that of the heater element and the other of said sections having a temperature coefficient of electrical resistance smaller than that of the heater elements so that the combined temperature coefficient of electrical resistance of both of said sections will be substantially equal to that of a heater element, and means to adjustably connect the two sections of each ratio element to vary the electrical resistance and the temperature coefficient of the electrical resistance of said element, a fixed resistance in parallel with one of the ratio elements, and an adjustable resistance in parallel with the other ratio element.

4. In a gas analysis apparatus, a Wheatstone bridge having two heater elements and two ratio elements, said heater elements being made of platinum, each of said ratio elements comprising at least two resistance sections, one of said resistance sections being made of nickel and the other section being made of an alloy containing substantially 84% copper, 12% manganese, and 4% nickel, said nickel resistance section constituting approximately 80% of the total resistance of the ratio element, said section being proportioned so that the coefficient of electrical resistance of a ratio element is substantially equal to that of the heater element, means to adjustably connect the two sections of each ratio element to vary the electrical resistance and the temperature coefficient of the electrical resistance of said element, a fixed resistance in parallel with one of the ratio elements, and an adjustable resistance in parallel with the other ratio element.

5. In a gas analysis apparatus, a Wheatstone bridge having two heater elements and two ratio elements, said heater elements being made from a material having a high temperature coefficient of electrical resistance, each of said ratio elements having at least two sections, at least one of which sections has a temperature coefficient of electrical resistance greater than that of the heater element and at least one of which sections has a temperature coefficient of electrical resistance smaller than that of the heater elements so that the combined temperature coefficient of electrical resistance of said sections will be substantially equal to that of the heater element, and means to adjustably connect at least two sections of each ratio element to vary the electrical resistance of said element.

HANS LAUB.